US011272823B2

United States Patent
Orzechowski et al.

(10) Patent No.: US 11,272,823 B2
(45) Date of Patent: Mar. 15, 2022

(54) ZONE CLEANING APPARATUS AND METHOD

(71) Applicant: Neato Robotics, Inc., Newark, CA (US)

(72) Inventors: Pawel Orzechowski, Los Gatos, CA (US); Sarath Kumar Suvarna, Fremont, CA (US); Bryant Pong, San Jose, CA (US); Yari D'Areglia, Brugherio (IT); Marco Uberti, Tore de' Busi (IT); Jose Capriles, Foster City, CA (US); Ina Liu, Alameda, CA (US); Matthew John Znameroski, Menlo Park, CA (US)

(73) Assignee: NEATO ROBOTICS, INC., Newark, CA (US)

( * ) Notice: Subject to any disclaimer, the term of this patent is extended or adjusted under 35 U.S.C. 154(b) by 244 days.

(21) Appl. No.: 16/557,970

(22) Filed: Aug. 30, 2019

(65) Prior Publication Data

US 2020/0069140 A1 Mar. 5, 2020

Related U.S. Application Data

(60) Provisional application No. 62/726,141, filed on Aug. 31, 2018.

(51) Int. Cl.
*A47L 11/40* (2006.01)
*G05D 1/00* (2006.01)
*G05D 1/02* (2020.01)

(52) U.S. Cl.
CPC ....... *A47L 11/4011* (2013.01); *A47L 11/4061* (2013.01); *G05D 1/0016* (2013.01);
(Continued)

(58) Field of Classification Search
CPC ......... G05D 2201/0203; G05D 1/0274; G05D 1/0022; G05D 1/0016; G05D 2201/0215; G05D 1/0044; G05D 1/0246; G05D 1/0238; G05D 2201/0208; A47L 2201/04; A47L 11/4011; A47L 2201/06; A47L 11/4061; A47L 2201/00; A47L 11/00; A47L 11/20;
(Continued)

(56) References Cited

U.S. PATENT DOCUMENTS 5,896,488 A 4/1999 Jeong
6,459,955 B1 * 10/2002 Bartsch ................ G05D 1/0253
700/245

(Continued)

FOREIGN PATENT DOCUMENTS

WO 2007028049 A2 3/2007

OTHER PUBLICATIONS

Uddin et al., Path mapping and control of mobile cleaning robot using LED-ID network, 2011, IEEE, pg. (Year: 2011).*

(Continued)

*Primary Examiner* — McDieunel Marc
(74) *Attorney, Agent, or Firm* — Kilpatrick Townsend & Stockton LLP

(57) ABSTRACT

In one embodiment, a user indicates one or more virtual zones on an area map on a user device for a particular robot. The zones are then transferred to the robot. The robot determines an optimum order for multiple zones and a path for navigating to the different zones.

21 Claims, 14 Drawing Sheets

(52) U.S. Cl.
CPC ......... *G05D 1/0022* (2013.01); *G05D 1/0274* (2013.01); *A47L 2201/04* (2013.01); *A47L 2201/06* (2013.01); *G05D 2201/0203* (2013.01); *G05D 2201/0215* (2013.01)

(58) Field of Classification Search
CPC ... Y10S 901/01; B25J 9/1664; B25J 11/0085; E04H 4/1654; G05B 2219/45098; H04B 5/0031; A01D 2101/00; G01S 15/931; G01S 17/931
See application file for complete search history.

(56) References Cited

U.S. PATENT DOCUMENTS

| | | | |
|---|---|---|---|
| 6,671,592 | B1 | 12/2003 | Bisset et al. |
| 7,389,156 | B2 * | 6/2008 | Ziegler ............... A22C 17/0013 318/568.1 |
| 7,613,543 | B2 * | 11/2009 | Petersson ............. A01D 34/008 700/245 |
| 7,620,476 | B2 * | 11/2009 | Morse ................... A47L 5/14 15/319 |
| 7,920,941 | B2 | 4/2011 | Park et al. |
| 8,209,053 | B2 * | 6/2012 | Kim ..................... A47L 9/2852 700/245 |
| 8,655,539 | B2 | 2/2014 | Yoo et al. |
| 8,855,914 | B1 | 10/2014 | Alexander et al. |
| 8,903,589 | B2 | 12/2014 | Sofman et al. |
| 8,996,172 | B2 | 3/2015 | Shah et al. |
| 9,950,429 | B2 | 4/2018 | Kim et al. |
| 10,143,347 | B2 | 12/2018 | Lee et al. |
| 2008/0109126 | A1 | 5/2008 | Sandin et al. |
| 2013/0204463 | A1 * | 8/2013 | Chiappetta ........... G05D 1/0242 701/2 |
| 2014/0012418 | A1 | 1/2014 | Johnson et al. |
| 2016/0167234 | A1 | 6/2016 | Angle et al. |
| 2016/0267072 | A1 | 10/2016 | Williams et al. |
| 2018/0074508 | A1 * | 3/2018 | Kleiner ................ A47L 9/2852 |
| 2019/0212730 | A1 * | 7/2019 | Jones ..................... G05D 1/028 |
| 2019/0212752 | A1 * | 7/2019 | Fong ........................ G06K 9/00 |
| 2020/0019156 | A1 * | 1/2020 | Drew ....................... G06T 7/74 |
| 2020/0047343 | A1 * | 2/2020 | Bal ..................... A47L 11/4038 |

OTHER PUBLICATIONS

Jeon et al., Multiple robots task allocation for cleaning a large public space, 2015, IEEE, pg. (Year: 2015).*

Andersen et al., Combining a Novel Computer Vision Sensor with a Cleaning Robot to Achieve Autonomous Pig House Cleaning, 2015, IEEE, pg. (Year: 2015).*

Kim et al., Experience based domestic environment and user adaptive cleaning algorithm of a robot cleaner, 2014, IEEE, pg. (Year: 2014).*

All Home Robotics, Robotic Vacuums "Virtual Walls vs Lighthouses—What's are the Differences?" Retrieved on Jun. 1, 2018. Retrieved from the Internet: https://www.allhomerobotics.com/virtual-walls-vs-lighthouses/, 14 pages.

DEEBOT R95, "Brighten up Your Life with a Customized Clean", Retrieved on Jun. 1, 2018. Retrieved from the Internet: https://www.ecovacs.com/global/deebot-robotic-vacuum-cleaner/DEEBOT-R95/, 18 pages.

United Kingdom Patent Application No. GB1814165.5 filed Aug. 31, 2018, Combined Search and Examination Report dated Feb. 20, 2019, 7 pages.

* cited by examiner

ZONE CLEANING APPARATUS AND METHOD

CROSS-REFERENCES TO RELATED APPLICATIONS

This application is a Nonprovisional patent application of Ser. No. 62/726,141 entitled "Zone Cleaning Apparatus and Method," filed Aug. 31, 2018, the disclosure of which is hereby incorporated in its entirety.

RELATED APPLICATIONS

The present invention is related to application Ser. No. 15/996,290, filed Jun. 1, 2018, entitled "Robotic Virtual Boundaries."

BACKGROUND OF THE INVENTION

The present invention relates to robot navigation, in particular to navigating to a particular area for a cleaning robot.

Current cleaning robots have the ability to clean a specified cleaning area, and a small predefined area directly in front of the robot (spot clean).

BRIEF SUMMARY OF THE INVENTION

In one embodiment, a user indicates one or more virtual zones on an area map on a user device for a particular robot. A starting point in the zone is selected. The zone and starting point are then transferred to the robot. The robot determines a path to the starting point from its current location, and begins operating in the zone. Where multiple zones are indicated, the robot determines an order for navigating to the different zones.

In one embodiment, zones are marked on multiple floor plans. The robot will determine which floor it is on, and determine a zone cleaning schedule. If the robot is scheduled to clean zones and it is not on the right floor plan, the scheduled cleaning will be ignored or a message will be sent to the user prompting the user to move the robot to the scheduled floor plan.

In one embodiment, the user can label each created zone, and the labeled zone is stored on the user device. The user can later select the label to have the robot operate in the zone. In addition, the user can set up a time schedule for the robot to operate in the zone. Multiple zones can be designated to operate on different schedules.

In one embodiment, the zone will be automatically corrected. If the zone is drawn to extend beyond a wall, the zone can be corrected to stop at the wall. Alternately, the zone as drawn may stop just short of the wall and may be extended to the wall. The user may be provided feedback by indicating the corrected zone, such as by coloring the corrected zone. Alternately, it may be determined that the zone encompasses an obstacle, and the obstacle may be excluded from the zone. The revised zone and excluded areas are then transmitted to the robot.

In one embodiment, the application generates its own virtual zones and presents those zones, optionally with labels, to a user. The robot may suggest a boundary or modify a zone where it detects a drop (e.g., stairs), or where it detects obstacles that may cause entanglement (e.g., wiring), or where it has gotten stuck before. The user can then accept or change the zones and labels.

In one embodiment, different zones, potentially overlapping, can be used at different times, such as according to a schedule. For example, the zone can be set to direct the robot to a high traffic area for cleanings between normal cleanings of the entire area, or different zones, according to a schedule. In another example, different cleaning modes can be associated with different times for the area indicated by the zone, such as light, normal or intense cleaning or vacuum, wet mop, or other cleaning modes. In addition to a set schedule, the robot can be directed to the zone(s) upon detecting an event. For example, the event can be detecting that the user's mobile device has gone outside a geo-fenced area (e.g., the user has left the house).

In one embodiment, a user indicates one or more zones on an area map for a particular robot. The zones are provided to a remote server in the global coordinates of the area map. The zones are then downloaded to the robot. The robot converts the zones in global coordinates by segmenting the zones into a plurality of line segments corresponding to a plurality of partial maps. The line segments are converted into local coordinates for each partial map. Upon entering each partial map area, the robot compares the line segments to the partial map to determine the zone area for the partial map.

In one embodiment, an application on a user device provides an interface for intuitive drawing of zones. One or more shapes are provided, such as a rectangle, L-shape and T-shape. The user can then select, drag and drop, and size the shape. The sizing could be done by dragging a corner, pinching or separating the fingers, or other gestures.

DETAILED DESCRIPTION OF THE INVENTION

Overall Architecture

Figure 1:
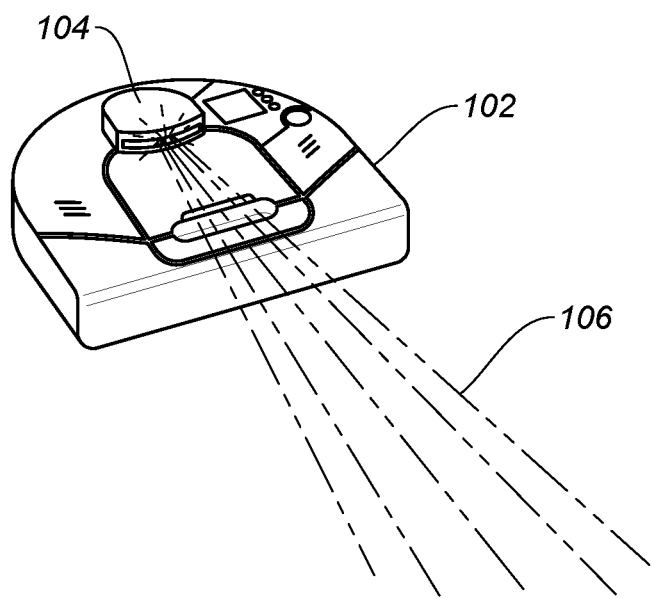
FIG. 1 is a diagram of a cleaning robot with a LIDAR turret according to an embodiment.

FIG. 1 is a diagram of a cleaning robot with a LIDAR turret according to an embodiment. A cleaning robot 102 has a LIDAR (Light Detection and Ranging) turret 104 which emits a rotating laser beam 106. Detected reflections of the laser beam off objects are used to calculate both the distance to objects and the location of the cleaning robot. One embodiment of the distance calculation is set forth in U.S. Pat. No. 8,996,172, "Distance sensor system and method," the disclosure of which is incorporated herein by reference. Alternately, VSLAM (Visual SLAM using image sensors) or other localization methods can be used. The collected data is also used to create a map, using a SLAM (Simultaneous Location and Mapping) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
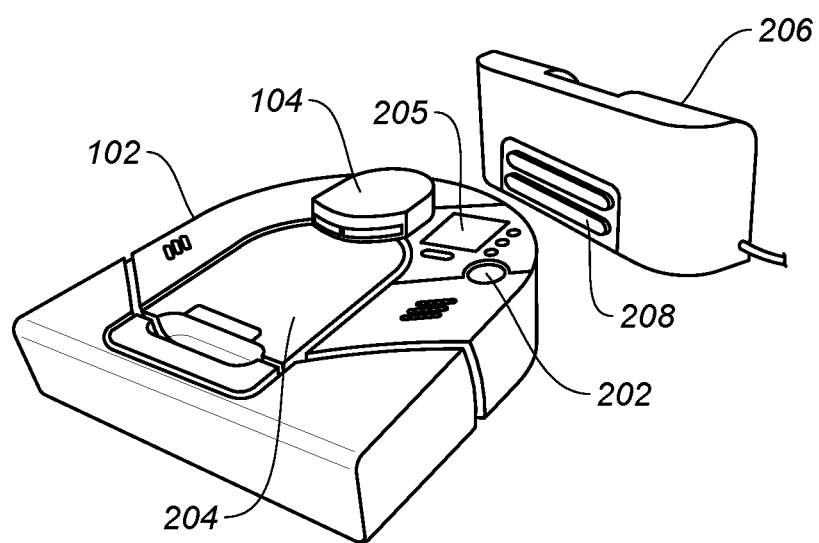
FIG. 2 is a diagram of a cleaning robot and charging station according to an embodiment.

FIG. 2 is a diagram of a cleaning robot and charging station according to an embodiment. Cleaning robot 102 with turret 10 is shown. Also shown is a cover 204 which can be opened to access a dirt collection bag and the top side of a brush. Buttons 202 allow basic operations of the robot cleaner, such as starting a cleaning operation. A display 205 provides information to the user. Cleaning robot 102 can dock with a charging station 206, and receive electricity through charging contacts 208.

Figure 3:
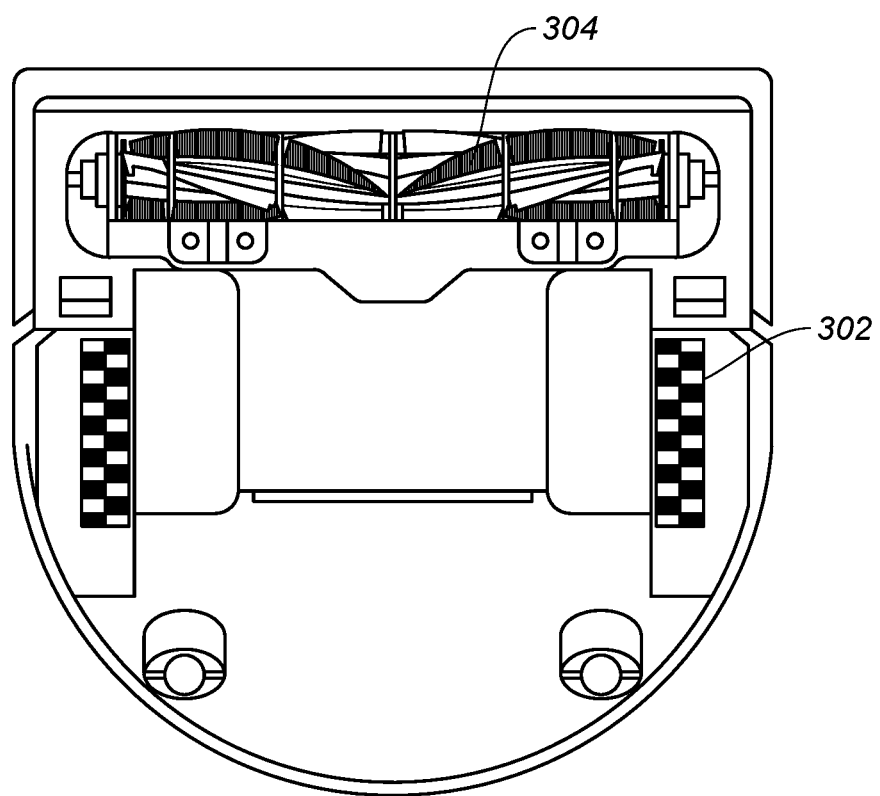
FIG. 3 is a diagram of the underside of a cleaning robot according to an embodiment.

FIG. 3 is a diagram of the underside of a cleaning robot according to an embodiment. Wheels 302 move the cleaning robot, and a brush 304 helps free dirt to be vacuumed into the dirt bag.

Figure 4:
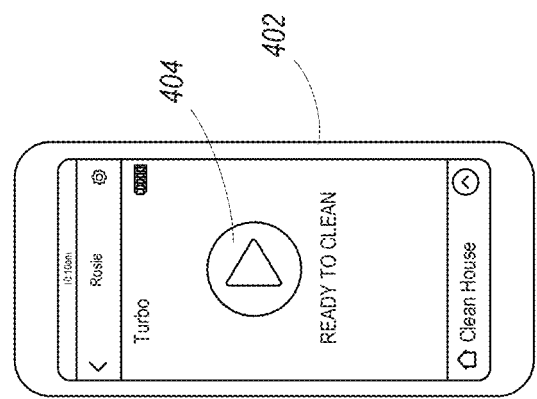
FIG. 4 is a diagram of a smartphone control application display for a cleaning robot according to an embodiment.

FIG. 4 is a diagram of a smartphone control application display for a cleaning robot according to an embodiment. A smartphone 402 has an application that is downloaded to control the cleaning robot. An easy to use interface has a start button 404 to initiate cleaning.

Figure 5:
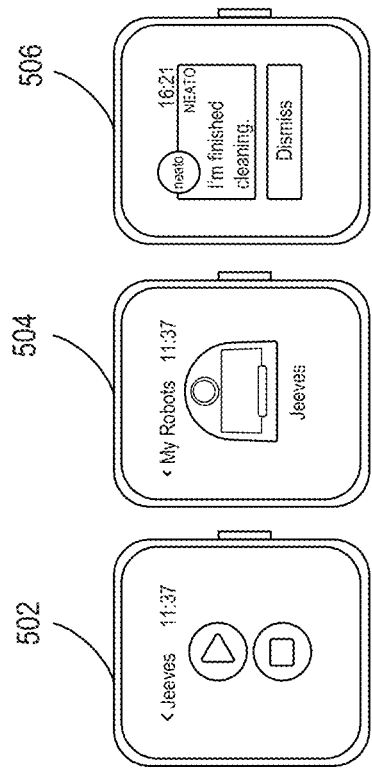
FIG. 5 is a diagram of a smart watch control application display for a cleaning robot according to an embodiment.

FIG. 5 is a diagram of a smart watch control application display for a cleaning robot according to an embodiment. Example displays are shown. A display 502 provides and easy to use start button. A display 504 provides the ability to control multiple cleaning robots. A display 506 provides feedback to the user, such as a message that the cleaning robot has finished.

Figure 6:
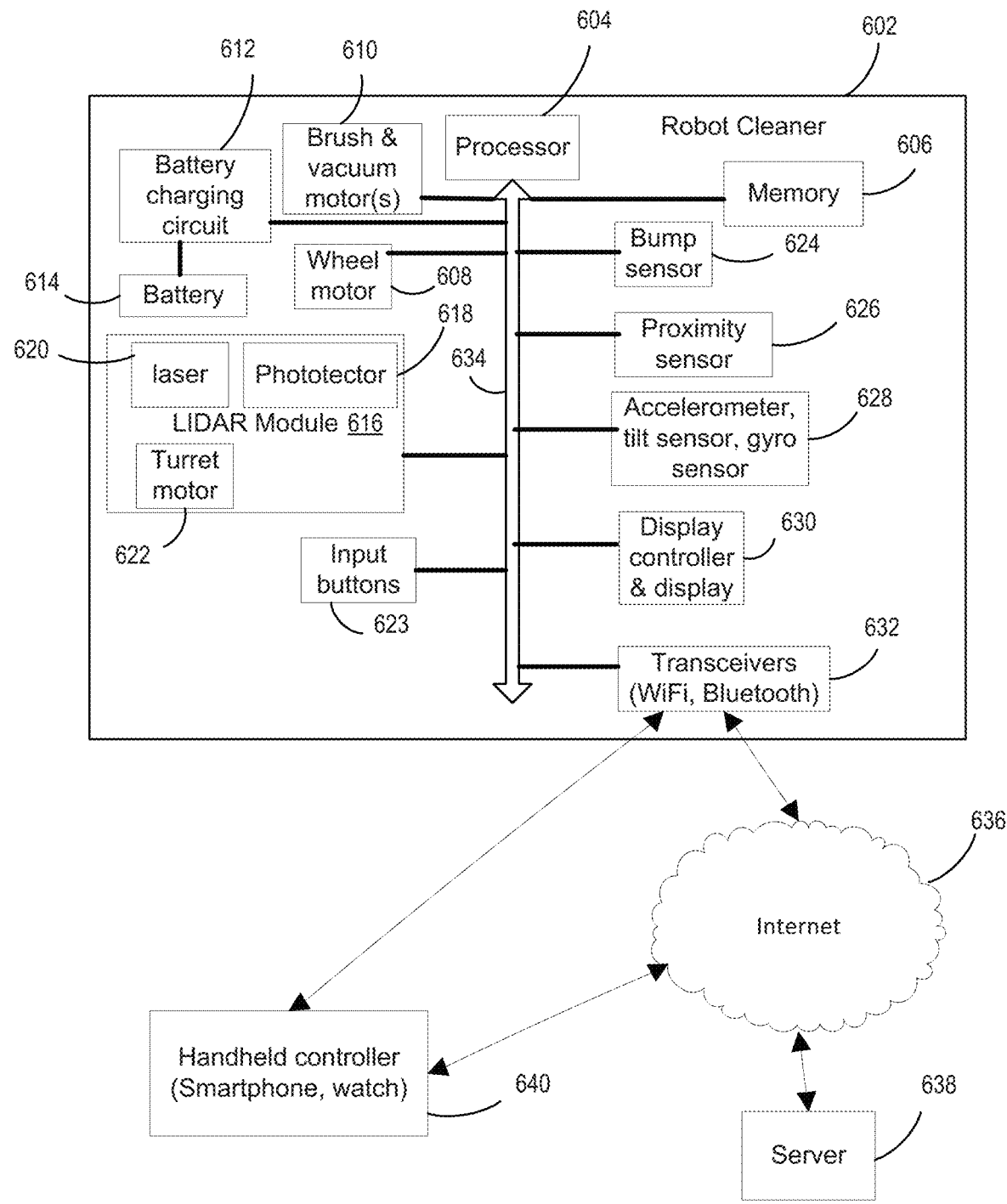
FIG. 6 is a diagram of a the electronic system for a cleaning robot according to an embodiment.

FIG. 6 is a high level diagram of a the electronic system for a cleaning robot according to an embodiment. A cleaning robot 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the floor, and can be operated in different modes, such as a higher power intensive cleaning mode or a normal power mode.

LIDAR module 616 includes a laser 620 and a detector 616. Alternately, an image sensor can be used with a VSLAM operation. A turret motor 622 moves the laser and detector to detect objects up to 360 degrees around the cleaning robot. There are multiple rotations per second, such as about 5 rotations per second. Various sensors provide inputs to processor 604, such as a bump sensor 624 indicating contact with an object, proximity sensor 626 indicating closeness to an object, and accelerometer and tilt/gyroscopic sensors 628, which indicate a drop-off (e.g., stairs) or a tilting of the cleaning robot (e.g., upon climbing over an obstacle). The robot can include either one of, or any combination of, a tilt sensor, accelerometer and gyroscopic sensor, and can contain multiple ones of each type of sensor. Examples of the usage of such sensors for navigation and other controls of the cleaning robot are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a floor sensor for detecting the type of floor, and an image sensor (camera) for providing images of the environment and objects.

A battery 614 provides power to the rest of the electronics though power connections (not shown). A battery charging circuit 612 provides charging current to battery 614 when the cleaning robot is docked with charging station 206 of FIG. 2. Input buttons 623 allow control of robot cleaner 602 directly, in conjunction with a display 630. Alternately, cleaning robot 602 may be controlled remotely, and send data to remote locations, through transceivers 632.

Through the Internet 636, and/or other network(s), the cleaning robot can be controlled, and can send information back to a remote user. A remote server 638 can provide commands, and can process data uploaded from the cleaning robot. A handheld smartphone or watch 640 can be operated by a user to send commands either directly to cleaning robot 602 (through Bluetooth, direct RF, a WiFi LAN, etc.) or can send commands through a connection to the internet 636. The commands could be sent to server 638 for further processing, then forwarded in modified form to cleaning robot 602 over the internet 636.

Computer Systems for Media Platform and Client System

Figure 7:
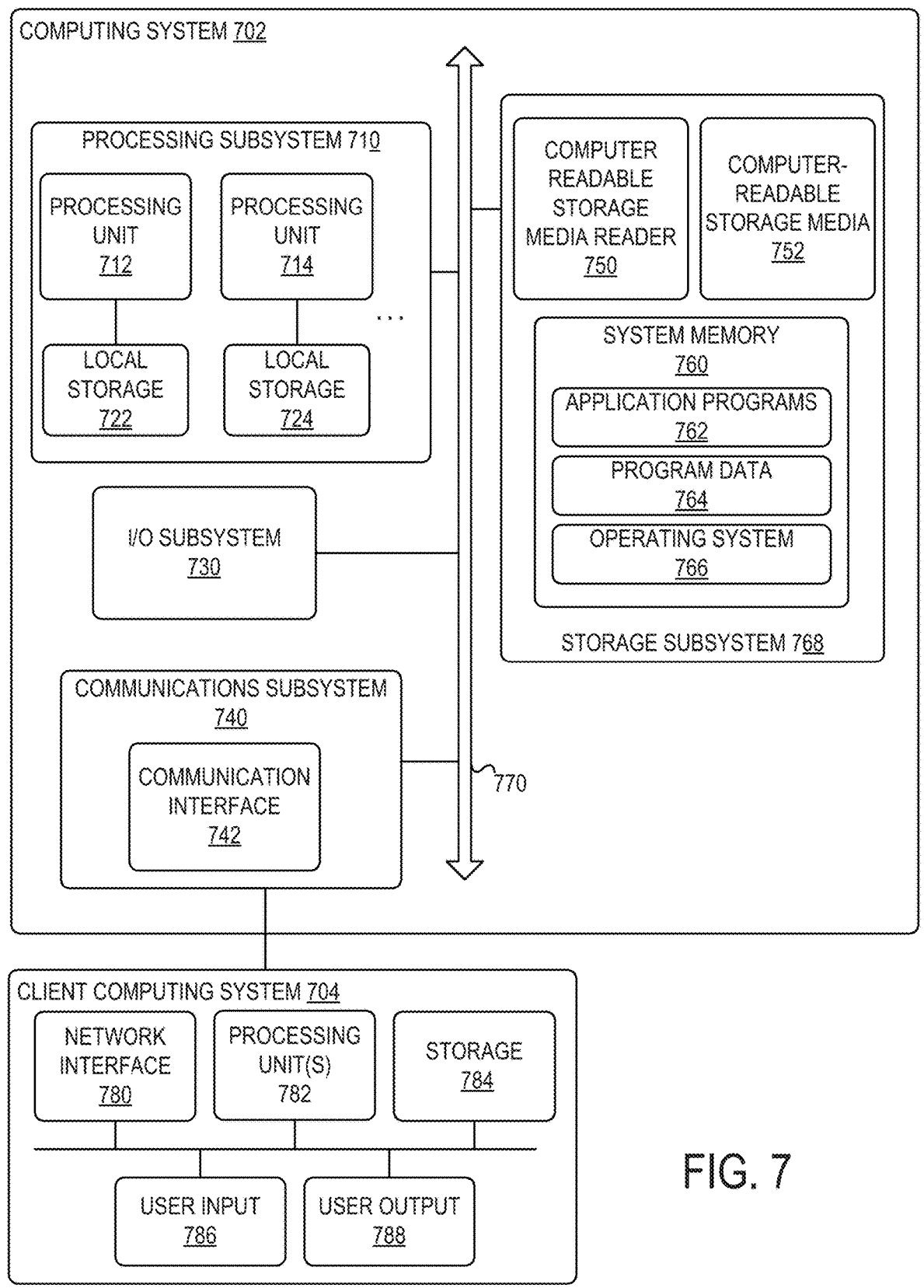
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the cleaning robot processor system, remote server, or any other computing system described herein or portions thereof. Client computing system 704 or similar systems may implement user devices such as a smartphone or watch with a robot cleaner application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Zone Cleaning

In one embodiment, an application for controlling a robot, such as a cleaning robot, is downloaded to a user device (smart phone, tablet, computer, etc.). The application receives a map generated by the robot using SLAM, VSLAM, or other methods. The map is displayed on the user device, and an intuitive user interface is provided allowing the user to indicate zones for the robot to operate in. Those zones can indicate areas to be cleaned, or other functions that the robot might perform (monitoring WiFi signal strength, performing security operations such as making noise or monitoring operations such as taking pictures). The user can draw zones on the map with a finger, stylus, pointer, or other device.

The user can define a zone and set unique properties to these zones. These zones can have unique cleaning parameters that tell the robot how to clean a particular zone(s) at a particular time in a particular cleaning mode. E.g., users can name the zone (i.e. Kitchen) and have the robot clean the 'kitchen' zone in 'deep clean' mode on Saturday @ 3:00 p.m.

Some of the zone properties are:
User defined areas. User can draw zones to be cleaned
Each area has unique properties (name, cleaning mode etc.)
Each area can be scheduled to be cleaned at different times
Each area can be cleaned in a user defined order (or optimal robot decided order)
Robot can automatically navigate to the zone to start cleaning In one embodiment, the application determines not only the boundaries of the zone, it also performs the computation for a relevancy point or starting point (a point that is guaranteed to be within the zone boundaries). The relevancy point is similar to a destination point on a GPS map. This information is sent to the robot. The robot determines the best path to navigate from its location to the relevancy point. The robot will use the initial relevancy point and pick a better one if one exists.

Figure 8:
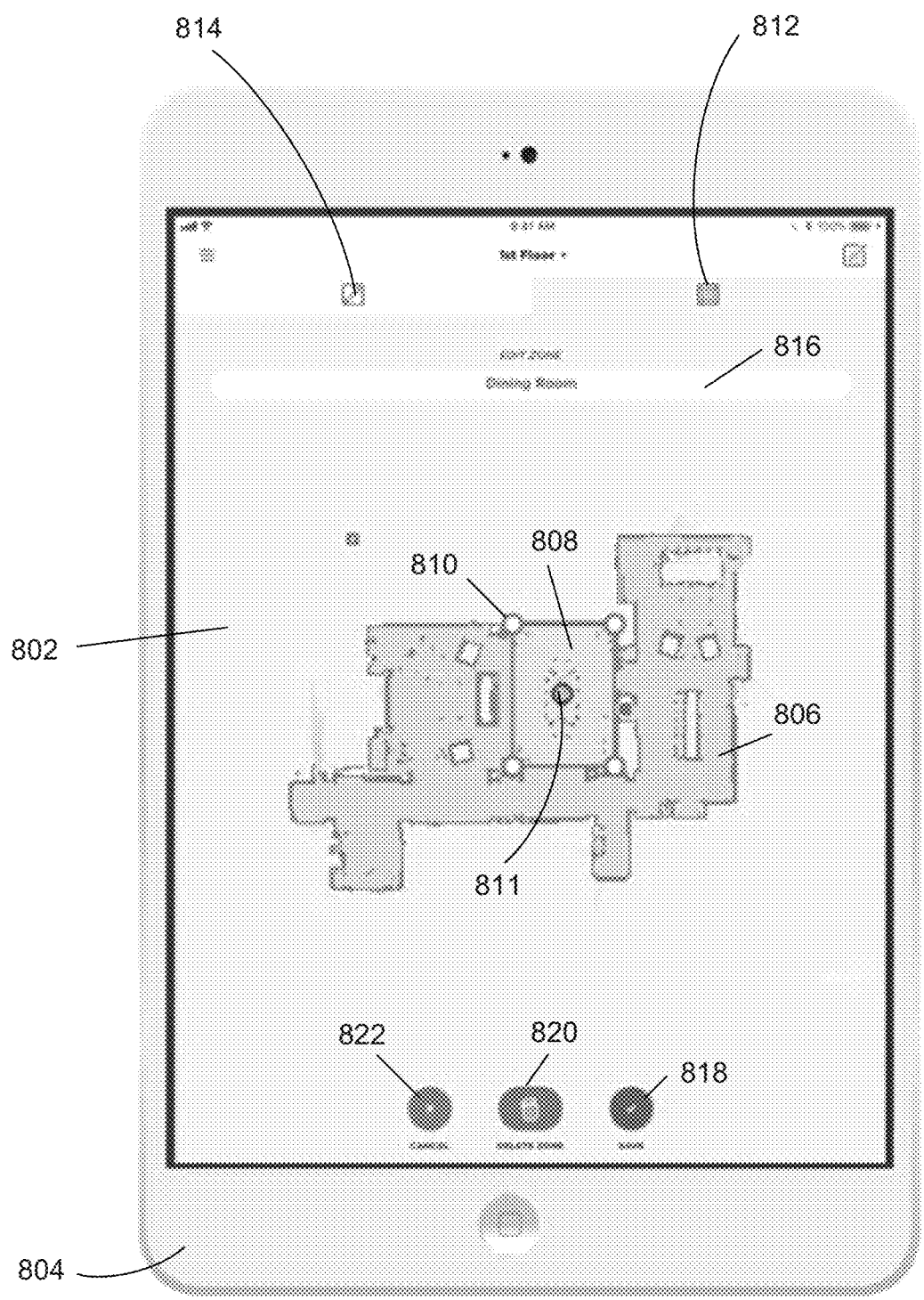
FIG. 8 is a diagram of a user interface on a mobile device showing the creation of a zone on a map according to an embodiment.

FIG. 8 is a diagram of a user interface on a mobile device showing the creation of a zone on a map according to an embodiment. A Graphical User Interface display 802 is provided on a smart phone 804. A map 806 is displayed, and a user has indicated a zone 808, using corner points such as corner point 810 to adjust the size of zone 808. Zone 808 may be dragged and dropped from a menu of zone shapes that could be displayed alongside the map, or presented in a pop-up menu for user selection. Zone shapes in one embodiment are a rectangle, L-shape and T-shape. Alternately, a user can select a custom zone shape with more corner points and line segments to form other shapes. A relevancy point 811 is shown in the middle of zone 808. Alternately, the relevancy point could be at a corner or any other location within zone 808.

FIG. 8 shows the map 806 and zone 808 on a tab indicated by a zone icon 812. A separate tab icon 814 can be selected to provide a map for drawing "no-go" lines, or virtual boundaries, as described in application Ser. No. 15/996,290, filed Jun. 1, 2018, entitled "Robotic Virtual Boundaries," the disclosure of which is incorporated herein by reference. A label field 816 allows a user to name the zone. Once the zone is named, it can be saved by clicking save icon 818. If the user desires to delete the zone, that can be done with delete icon 820. A "cancel" icon 822 allows the current in-process zone to be cancelled. The zones can be used instead of the no-go lines to indicate areas the robot is to avoid, rather than areas the robot is to clean. This could be done, for example, by hitting an icon that normally indicates "cleaning zone," but when touched or toggled indicates "no-go zone."

Figure 9:
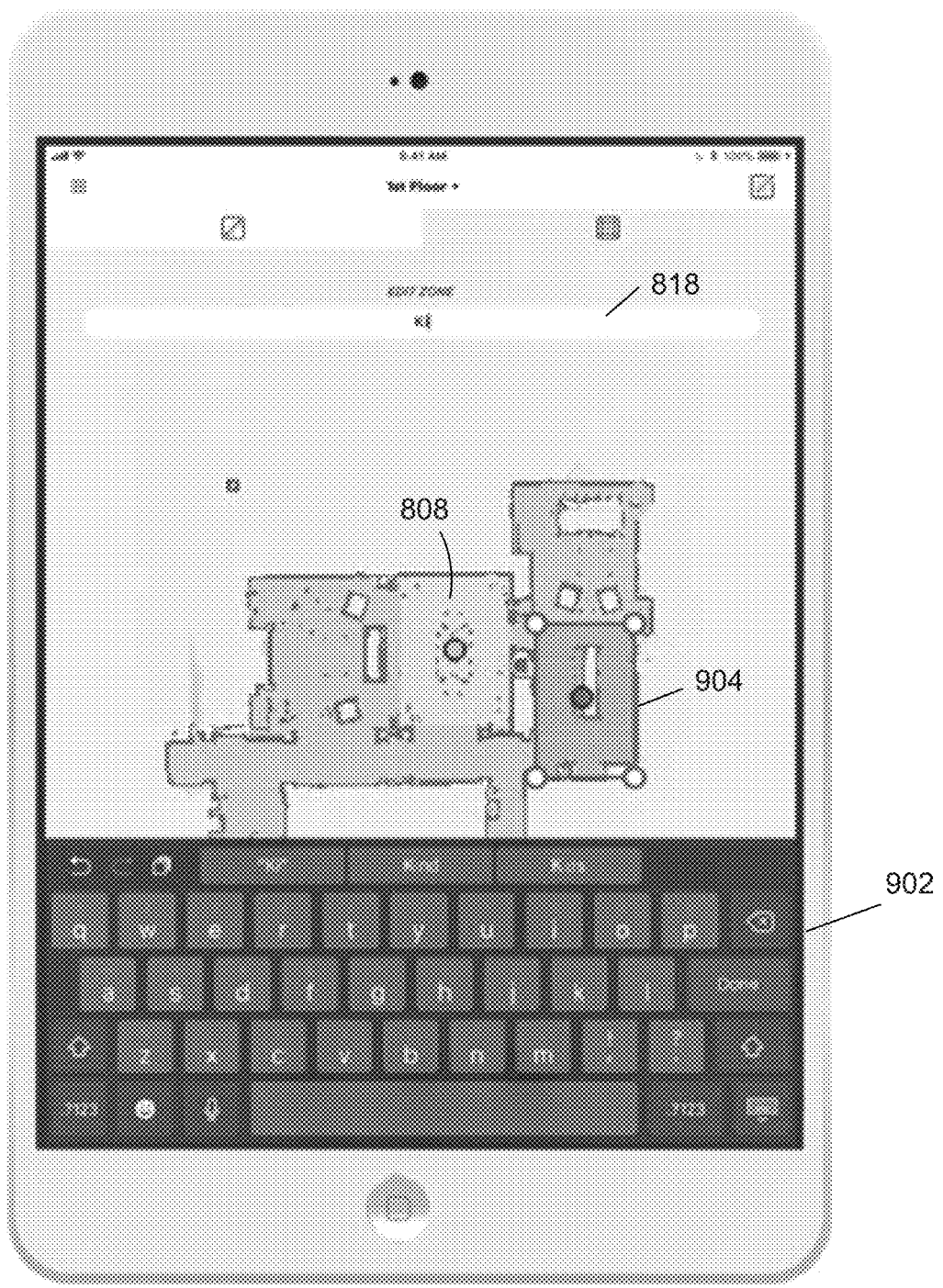
FIG. 9 is a diagram of a user interface on a mobile device showing the labelling of a zone on a map according to an embodiment.

FIG. 9 is a diagram of a user interface on a mobile device showing the labelling of a zone on a map according to an embodiment. By clicking in label field 818, a soft keyboard 902 is made to appear, allowing the user to enter a label for the zone just created. Here, a separate zone 904 has been created and is being labelled.

Figure 10:
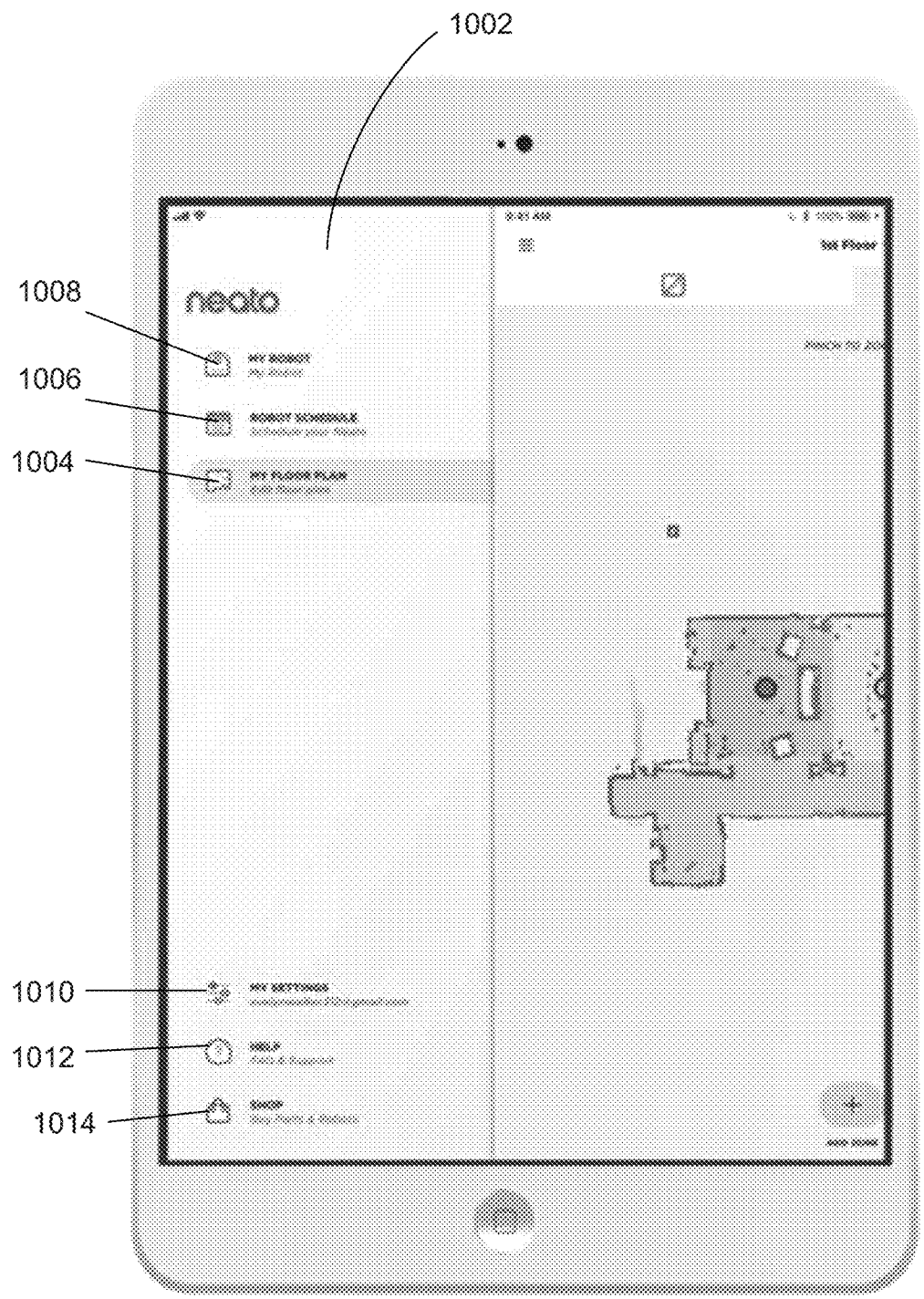
FIG. 10 is a diagram of a user interface on a mobile device showing a menu of options related to a zone on a map according to an embodiment.

FIG. 10 is a diagram of a user interface on a mobile device showing a menu of options related to a zone on a map according to an embodiment. A menu field 1002 appears, such as when a user saves, cancels or deletes a zone. The user can return to the map by clicking on it, or clicking on the highlighted icon 1004 "My Floor Plan" for editing the floor plan. Icon 1006 provides the Robot Schedule, for scheduling the robot for different zones or the overall map. Icon 1008 returns to the home page for the robot application. Also shown are a settings icon 1010, a help icon 1012 and a shopping icon 1014 (for buying parts and robots).

In one embodiment, the user can designate different floor plans, or will receive different floor plans from the robot. For example, if there are stairs between levels, when the user places the robot on a different level, it will generate and use a different floor plan. The user can mark zones on each of multiple floor plans. The robot will determine which floor plan it is on, and clean the zones marked for that floor plan. The user can also designate different schedules for each floor plan. The robot will clean according to such cleaning schedules if it is located on the appropriate floor plan. If the robot is scheduled to clean zones and it is not on the right floor plan, the scheduled cleaning will be ignored or a message will be sent to the user prompting the user to move the robot to the scheduled floor plan.

Figure 11:
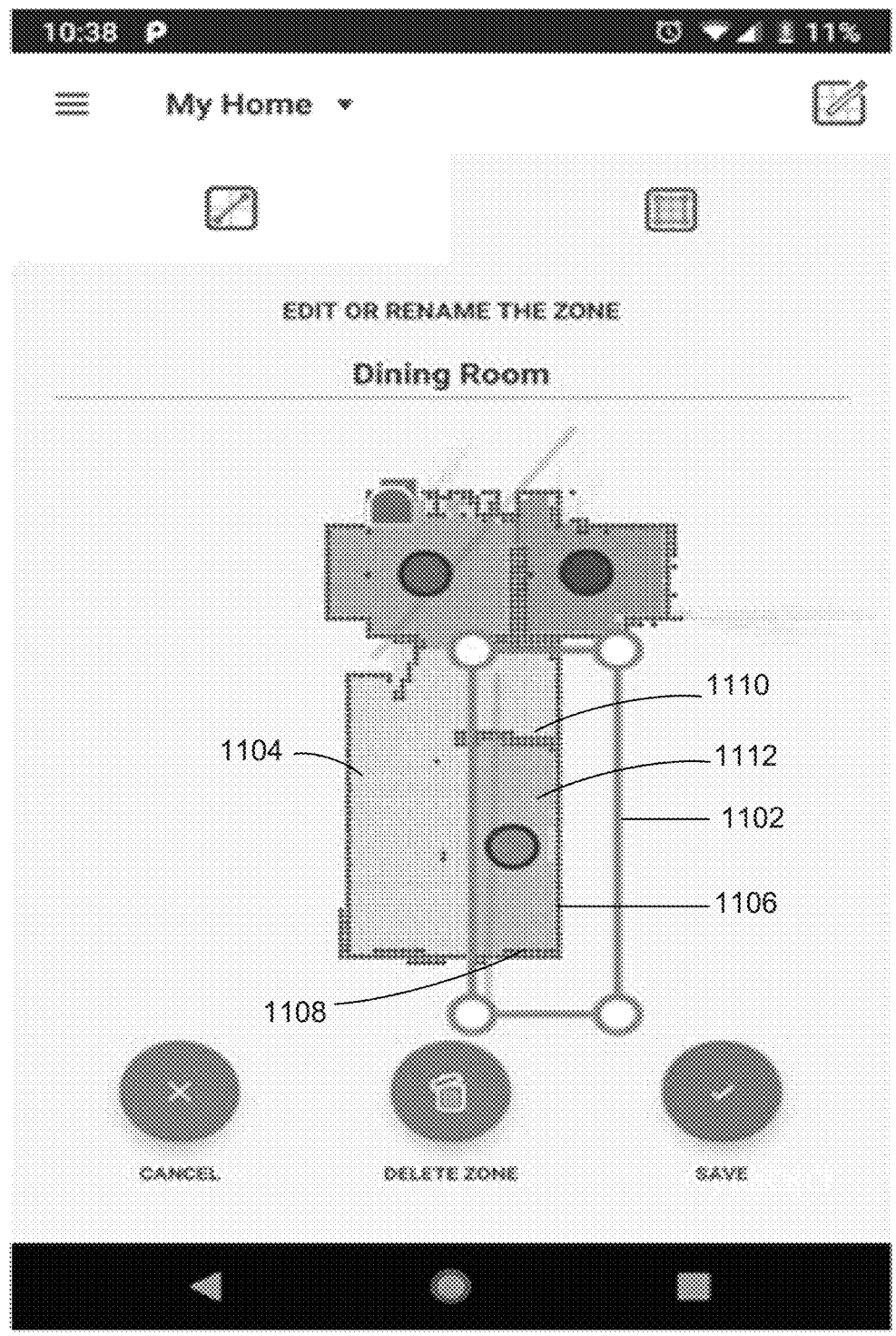
FIGS. 11-13 are diagrams of a user interface on a mobile device illustrating the adjustment of zones on a map according to an embodiment.
Figure 12:
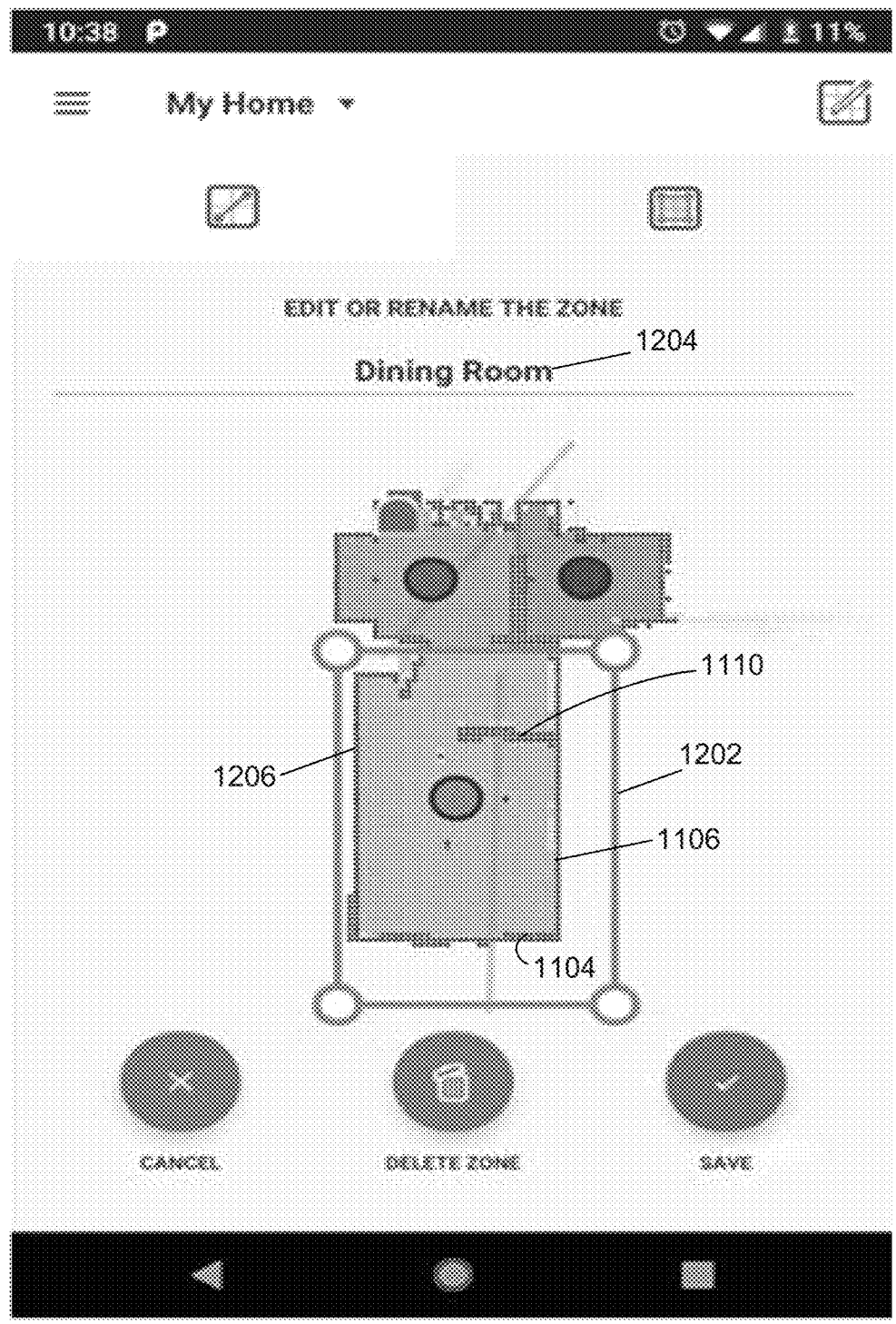
Figure 13:
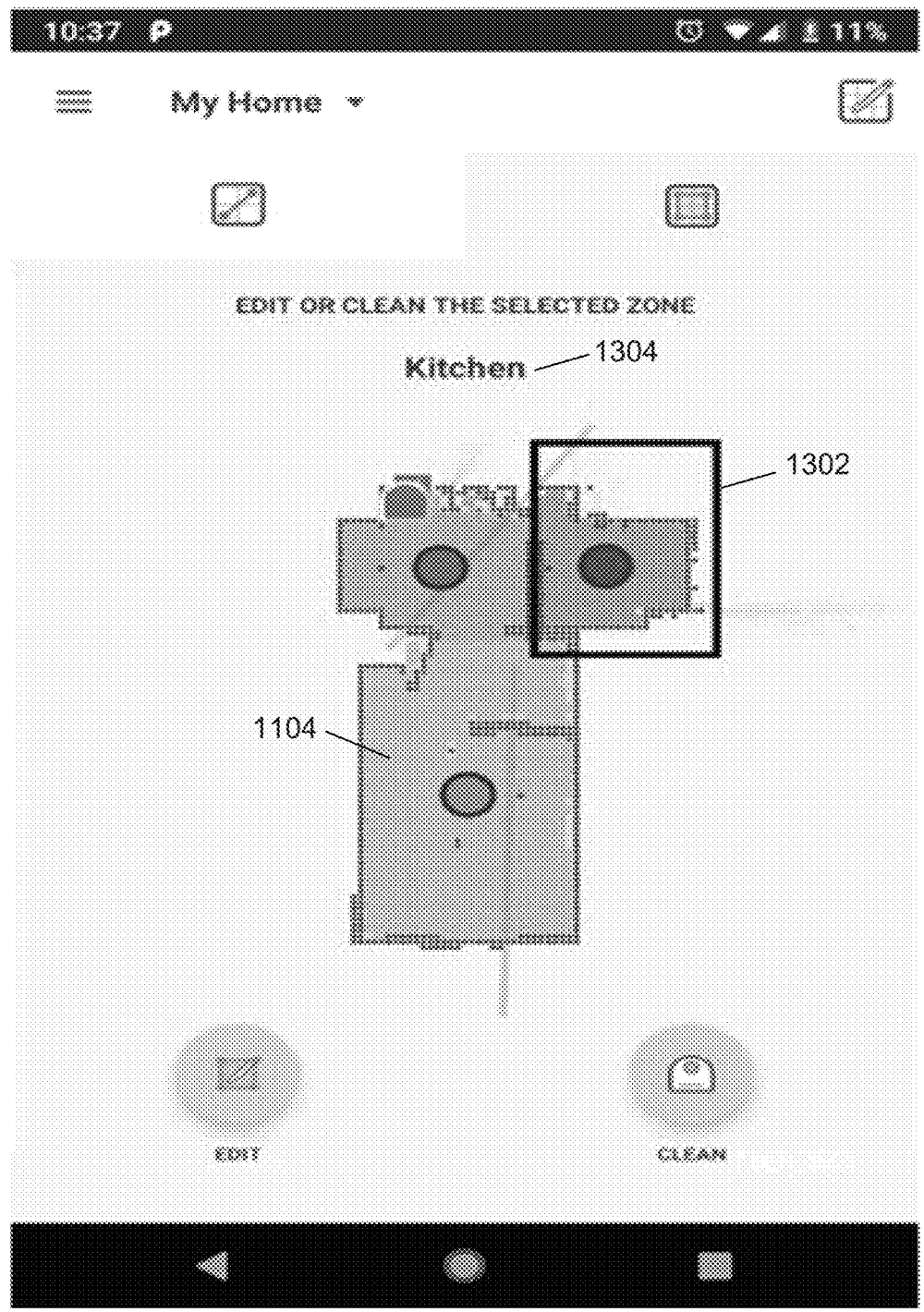

FIGS. 11-13 are diagrams of a user interface on a mobile device illustrating the adjustment of zones on a map according to an embodiment. As shown in FIG. 11, a zone 1102 has been drawn which extends outside of map 1104. The application will recognize that the zone extends beyond external walls 1106 and 1108, and also beyond internal wall 1110. The zone will be automatically resized to the dark shaded area indicated as adjusted zone 1112. Because the robot can't get to the region beyond wall 1110 without exiting the zone, the zone is reduced as shown.

The shaded or colored zone 1112 provides feedback to the user. The user may decide that the area beyond wall 1110 should be included, and may widen the zone to a zone 1202 as shown in FIG. 12. Zone 1202 has been labeled as the Dining Room as shown at 1204. This new zone 1202 will also be reduced to conform to the exterior walls 1106, 1108 and 1206. However, since the robot can now go around wall 1110 without leaving the zone, wall 1110 does not limit the size of the zone.

FIG. 13 shows a zone box 1302 for an area that has been labeled the kitchen 1304. This will also be automatically adjusted to limit the zone 1302 to be within the exterior walls of map 1104. If a drawn zone encompasses two areas that are not joined, the application will assume the larger area is the zone, and provide an indication of that adjustment to the user.

Figure 14:
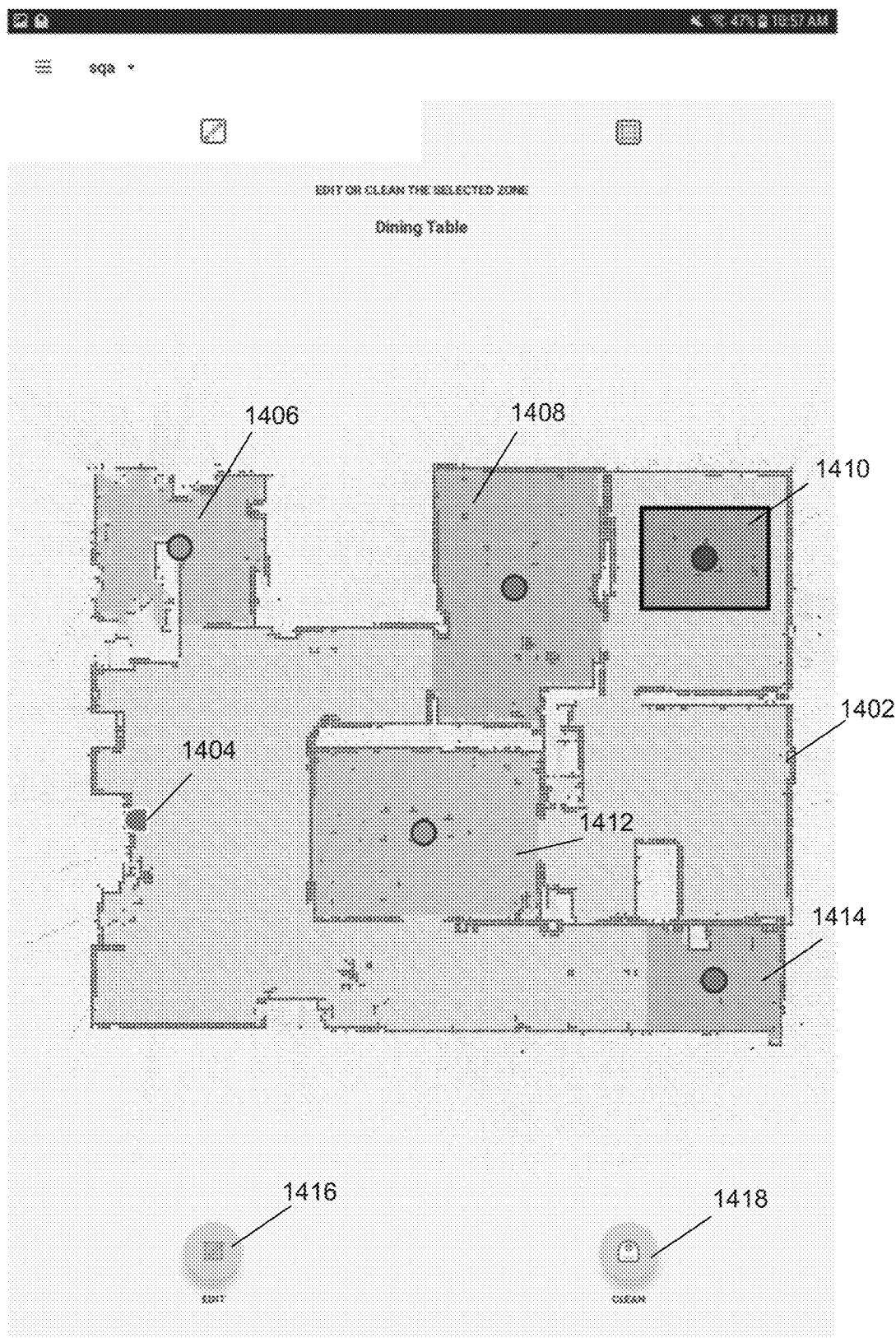
FIG. 14 is a diagram of a user interface on a mobile device showing a map sent to a user for indicating a zone on a map according to an embodiment.

FIG. 14 is a diagram of a user interface on a mobile device showing a map sent to a user for indicating a zone on a map according to an embodiment. A map 1402 that has been generated by the robot is uploaded to a server and downloaded to an application on a user device. The map as illustrated shows the location of the robot charging station 1404, and multiple zones 1406, 1408, 1410, 1412 and 1414. As can be seen, these zones are discontiguous. The zones could be automatically generated by the application based on information from the robot, such as recognizing a refrigerator indicating a kitchen. The indication of the zones and the labeling can be done in the robot, after uploading the information to the server, or after downloading the information to the application on the user device. Either the robot, server or application can auto-segment the map into zones, such as those shown. This can be done automatically to provide a starting point that saves the user some work. The user can then continue to edit and adjust from there. For example, the user can enlarge the provided zones, shrink them, move them, narrow them, delete them, etc. They could select a suggested zone and adjust it as needed. Alternately, a map without zones is provided, and the user draws the zones shown in FIG. 14. An edit button 1416 enables the user to create a zone, as illustrated above.

A user can select a zone for cleaning, such as by a schedule, or by tapping a zone. As shown, a user has selected zone 1410, such as by tapping on the zone with a finger. A black border is generated around the zone to indicate it has been selected. If the users selects another zone, it would also be given a black border. Alternately any other feedback could be provided to indicate selection, such as darkening the color of the zone, having the zone flash, graying-out the unselected zones, etc. After the user is done selecting, icon/button 1418 is activated to send a command to start cleaning the selected zone. The zones can be modified/configured with different modes and labels as described herein.

Figure 15:
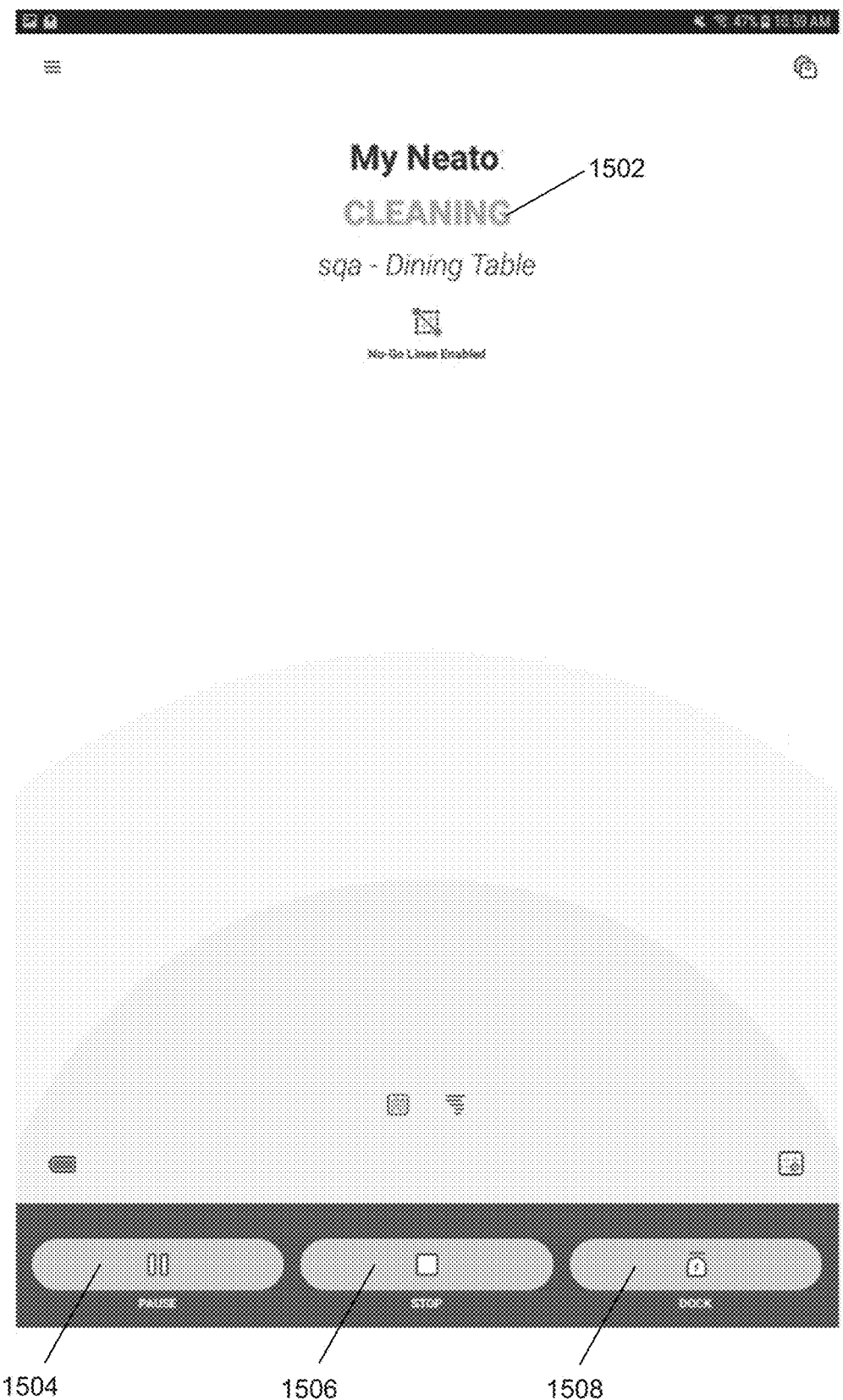
FIG. 15 is a diagram of a user interface on a mobile device showing feedback to the user during a zone cleaning operation according to an embodiment.

FIG. 15 is a diagram of a user interface on a mobile device showing feedback to the user during a zone cleaning operation according to an embodiment. The robot (or the application) tells the user that it is going to clean and is cleaning the indicated zone (with text 1502). During the cleaning, the user can select icons to pause the cleaning (1504), stop the cleaning (1506) or cause the robot to stop and return to its docking/charging base (1508).

Figure 16:
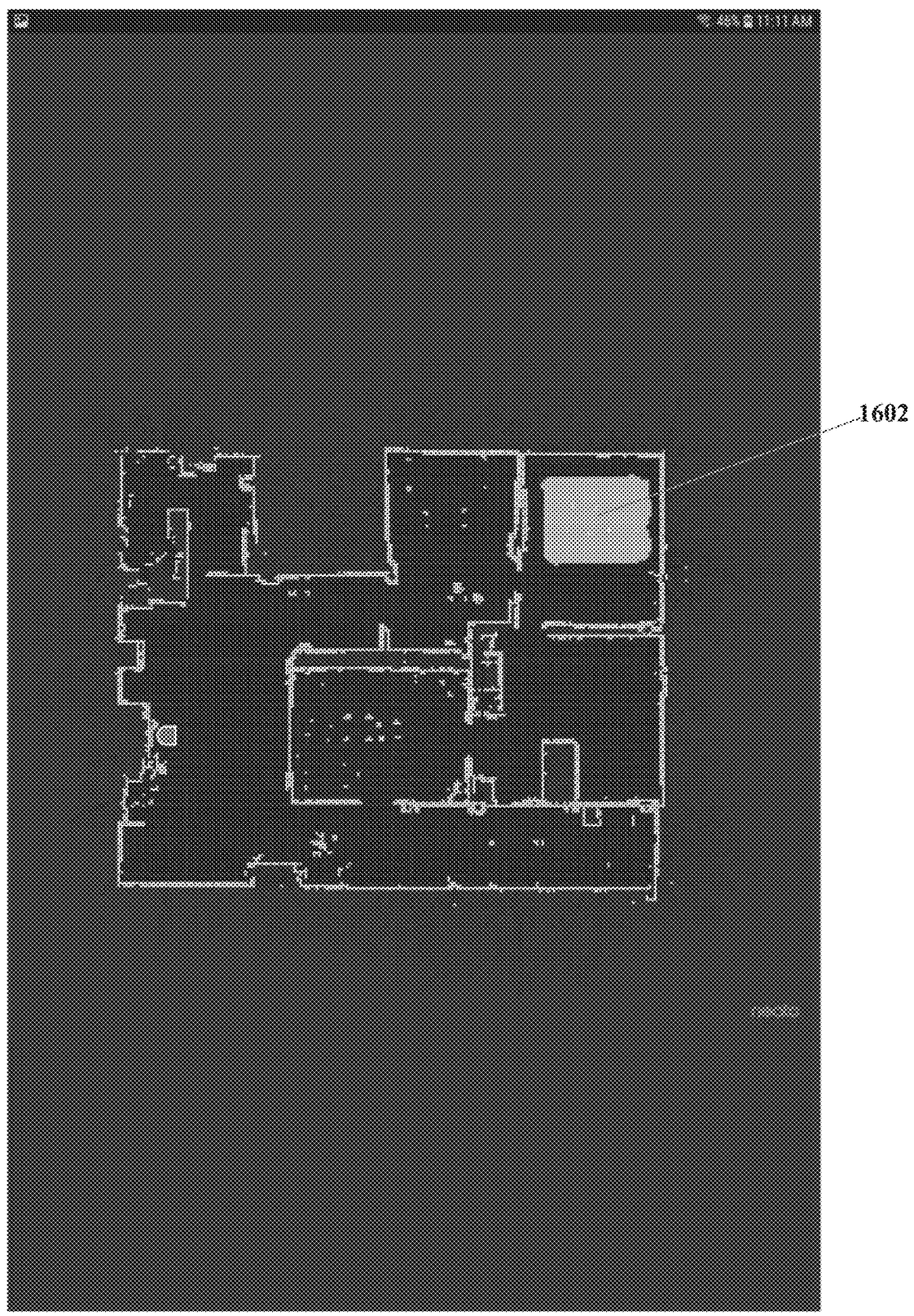
FIG. 16 is a diagram of a user interface on a mobile device showing a map provided upon completion of cleaning and showing the zones cleaned according to an embodiment.

FIG. 16 is a diagram of a user interface on a mobile device showing a map provided upon completion of cleaning and showing the zones cleaned according to an embodiment. The highlighted area 1602 indicates that this is the area that was cleaned.

Waypoint Navigation

In one embodiment, a user indicates multiple virtual zones on an area map on a user device for a particular robot. A relevancy point (zone starting point) in the zone is selected by the application. This could be a corner of the zone, the middle of the zone, or a random location. If the robot location is known to the application, the closest point to the robot location can be chosen. The zone starting point can be required to be a predetermined distance from an obstacle, such as the 1.5 times the width or length of the robot. Alternately, the closest point to the robot charge base, or the current robot location, or to the nearest other zone could be chosen. The zone and zone starting point are then transmitted to the robot. The robot determines a path to the zone starting point from its current location (the robot starting point), and begins operating in the zone. The robot may change the relevancy or zone starting point for the next cleaning, such as where the application doesn't know the robot charge base location, and the robot is able to pick the closest point to the charge base. Or the robot may locate a corner as a good zone starting point for cleaning, and make that the zone starting point. In one embodiment, the following process is used to select the relevancy or zone starting point:

1) Import the target zone into the map.
2) From an initial interior point (e.g., a random point or corner), fill all area of the map up to obstacles and the zone boundaries. This determines the possible candidates for an optimal interior zone starting point.
3) Remove any candidate cells that are within a robot's radius distance to an obstacle or zone boundary, or a no-go line. This eliminates problematic areas.
4) Find the closest candidate cell from the robot in the map. This is the optimal zone starting location within the zone.

In one embodiment, where multiple zones are indicated, the robot determines an order for navigating to the different zones, selecting different zone starting points as waypoints. Alternately, this can be done in the application on the user device and transferred to the robot. The transfer can be a direct transmission (e.g., WiFi or Bluetooth), through the Internet (uploading to a server which then downloads to the robot) or any other method. The waypoint determination, or order of zones, is based on one or more factors. In one embodiment, the shortest total path through multiple zones determines the order. The shortest path would avoid obstacles and drops. This may simply be the closest zone, followed by the next closest, etc. However, depending on the location of doors, hallways, etc., the optimum path may involve a farther zone before a closer zone. Alternately, the farthest zone could be chosen first, so that when the robot finishes cleaning the closest zone last, and thus is closest to returning to the charging base.

Virtual Boundary Overlay

In one embodiment, the virtual boundaries and zones can be combined in different ways. For example, a virtual boundary can be drawn across a zone to break the zone into two zones. The two zones can then have different cleaning schedules. For example, the entire zone can be cleaned every Monday, while one half zone is also cleaned every Thursday. The portioning of zones can also be used to indicate an order of cleaning, so the critical area is cleaned first in case the robot runs out of battery power and/or the user has unexpected guests and decides to cut the cleaning short. Additionally, zones can be combined to create a larger zone. The combined and divided zones can be provided with separate labels for subsequent ease of user commands. For example, the kitchen and dining room may form a combined zone called a living area.

Battery Optimization

In one embodiment, the order of cleaning multiple zones may be optimized based on battery charge. For example, if the robot has 20% of its charge left, and the closest zone will require 30% of its total charge, while a farther zone is smaller and will only require 5% of charge, the robot may clean the farther zone first. It can then return to the base station to recharge, or clean a portion of the closer zone and then return to the base station. At the base station, it need not charge up to full charge, but rather sufficient charge to clean the remaining uncleaned portion of the zone, with enough charge to return to base with some buffer.

Labeling and Scheduling

In one embodiment, the user can label each created zone, and the labeled zone is stored on the user device. The user can later select the label to have the robot operate in the zone. In one example, this can be done by voice activation (e.g., "clean kitchen), with the voice being recognized on the user device (e.g., smartphone) or being recognized by a hub or other device that can communicate the instruction to the application on the user device (e.g., Amazon Alexa® cloud-based voice service). The labels are superimposed on the map on the application on the user device. Also, the zones are highlighted by coloring, with a different color for each zone in one embodiment. The coloring makes it easier for the user to distinguish zones.

In addition, the user can set up a time schedule for the robot to operate in the zone. Multiple zones can be designated to operate on different schedules. Zones on the same schedule could be colored with the same color to indicate this link quickly to the user. Striping or other patterning of the color could be used to indicate a partial overlap of schedules, but not the same exact schedule. Below is an example schedule:

TABLE 1

| Zone | Schedule |
| --- | --- |
| Kitchen | MWF 9 PM |
| Dining Room | MF 9 PM |
| Hallway | Sat. 5 PM |

In one embodiment, different zones, potentially overlapping, can be used at different times, such as according to a schedule. For example, the zone can be set to direct the robot to a high traffic area for cleanings between normal cleanings of the entire area, or different zones, according to a schedule. In another example, a different cleaning modes can be associated with different times for the area indicated by the zone, such as light, normal or intense cleaning or vacuum, wet mop, or other cleaning modes.

Event and Geo-Fence Triggering

In one embodiment, in addition to a set schedule, the robot can be directed to the zone(s) upon detecting an event. For example, the event can be detecting that the user's mobile device has gone outside a geo-fenced area (e.g., the user has left the house). The event can be time limited, so that a user leaving the house in the early morning (e.g., for work) will trigger cleaning, while leaving the house in the evening or on weekends will not. A geo-fence can also be internal to the house, such as changing the order of zone cleaning so that a zone where the user currently is, based on the location of the user's mobile device, is skipped until the user moves out of the zone. The user location could alternately be based on the location of a smart watch or other device that does not include the robot application, but is in communication with the device with the robot application.

Automatic Zone Correction

In one embodiment, the zone will be automatically corrected. If the zone is drawn to extend beyond a wall, the zone can be corrected to stop at the wall. If it is an interior wall, the zone will be modified to stop at the wall if the robot would have to leave the zone to reach the other side of the wall. Alternately, the zone as drawn may stop just short of the wall and may be extended to the wall. The user may be provided feedback by indicating the corrected zone, such as by coloring the corrected zone. Alternately, it may be determined that the zone encompasses an obstacle, and the obstacle may be excluded from the zone. One type of obstacle that can be excludes is a stairs, or drop off, and any area beyond the drop off that the robot can't get to. The revised zone and excluded areas are then transferred to the robot. Alternately, instead of removing an area after a drop-off from the zone, it can be flagged so that when the robot reaches the drop-off, it sends an alert to the user to pick up the robot and move it down the stairs to clean the rest of the zone. If two zones are drawn with a very small strip between them that belongs to neither zone, one or both zones could be extended to cover the area, so that portions of the area aren't left uncleaned unintentionally.

Default Zones

In one embodiment, the application generates its own virtual zones and presents those zones, optionally with labels, to a user. The labeling can be done with a camera on the robot and image recognition. For example, a room with a recognized refrigerator or stove could be labeled a kitchen. A recognized table with chairs in a room near the kitchen could be labeled a dining room. The robot may suggest a boundary or modify a zone where it detects a drop (e.g., stairs), or where it detects obstacles that may cause entanglement (e.g., wiring), or where it has gotten stuck before. The user can then accept or change the zones and labels.

Alternative Functions

In one embodiment, the robot may perform functions other than cleaning. For example, a cleaning robot, or a separate robot, could perform a security or monitoring function. It could be instructed to go to different zones on a schedule to take one or more pictures or a video. This could be used to monitor children, a pet, plants, etc. Alternately, a security function is performed by detecting open windows, an intruder, etc. The robot could also make sounds and flash lights to make it appear someone is at home. The robot could also perform various data gathering functions, such as monitoring WiFi signal strength, temperature, air quality, light levels, etc.

Zone Coordinates Transformation

In one embodiment, a user indicates one or more zones on an area map for a particular robot. The zones are provided to a remote server in the global coordinates of the area map. The zones are then downloaded to the robot. The robot converts the zones in global coordinates by segmenting the zones into a plurality of line segments corresponding to a plurality of partial maps. The line segments are converted into local coordinates for each partial map. Upon entering each partial map area, the robot compares the line segments to the partial map to determine the zone area for the partial map.

In one embodiment, an application on a user device provides an interface for intuitive drawing of zones. One or more shapes are provided, such as a rectangle, L-shape and T-shape, or any other polygon. The user can then select, drag and drop, and size the shape. Alternately, a custom shape option could be provided, with a selectable number of line segments. In another example, curved shapes can be provided, or curved segments could be added to another shape (e.g., rounded curve added to the end of a room with bay windows). The sizing could be done by dragging a corner, pinching or separating the fingers, or other gestures.

Boundary Extension

In one embodiment, a user indicates a virtual zone on the map. The application will note there is a gap between the boundary of the zone and a wall, or other more logical end to the zone. The application can automatically correct the boundary, and may present a proposed correction of a dotted line or colored-in area to the user on a display, extending the virtual boundary to the nearest wall. If the user accepts the correction, the boundary is extended. In one embodiment, the boundary can be extended regardless, without a correction provided to the user, or in situations where the user does not respond.

Boundary Modification

In one embodiment, the application or robot may detect that the zone comes near an obstacle, and that the robot can move closer to the obstacle than the boundary line of the zone. The robot could then adjust the boundary to be closer to the obstacle. The application/robot can determine that it can get closer to the obstacle without any problems, and may suggest a new virtual boundary. This may be done ahead of time by the application, or during a cleaning operation by the robot. As in the extended boundary example above, if the user accepts the correction, the boundary is adjusted. Alternately, the default is acceptance of the modification absent cancellation or override by the user. In one embodiment, the boundary can be adjusted regardless, without a correction provided to the user, or in situations where the user does not respond. Alternately, the application/robot may determine the boundary of the zone is too close to the object, and it bumps into the object or gets entangled in the object. The robot can then move the virtual boundary farther from the object to avoid problems.

In one embodiment, the robot modifies the zone provided by the application based on what the robot encounters in the zone. For example, a door may be closed or open that was indicated as the opposite on the map on the application. The robot may suggest a boundary where it detects a drop (e.g., stairs), or where it detects new obstacles such as a change in furniture position since the map was generated. The robot can take a picture of the object behind and send it to the user to aid in confirmation of the revised virtual boundary, or simply prompt the user to move the object.

In one embodiment, the robot senses objects, and object recognition is performed by the remote server or the robot. The objects can be sensed by imaging with a camera, an IR, ultrasonic or other sensor, or physical contact with a bump or contact sensor. The robot app may then automatically modify zones to avoid hazardous areas, such as a tangle of wires by a TV, a pet's bowl of water on the floor, etc. The user could then accept the revised boundaries or be motivated to move the hazardous object(s).

In one embodiment, the robot or application or user may use the zone boundaries to designate different types of cleaning areas, not just areas to be avoided. For example, a wooden or tile floor area may be indicated as requiring a different brush height, attachment, or different robot. A drop off may simply indicate an area to proceed with caution, using slower speed.

Partial to Global Maps.

In one embodiment, the robot maps its environment during a training run. Optionally, the robot can also be cleaning during the training run. The robot uses its sensors and a SLAM (Simultaneous Localization And Mapping) algorithm to map the area, and generate coordinates of objects (walls, obstacles, etc.) on that map. The robot generates a Portable Network Graphics (PNG) image of the map from the stored coordinates. The PNG map is then uploaded to a remote server. A Portable Graymap Format (PGM) image of the map is also generated for debugging purposes.

The server, through the Internet or other network or communication channel, provides the PNG map to an application running on a user device. The user indicates the virtual zone(s) on the map. The user app modifies the zones as described above. The user app calculates the global coordinates of the virtual boundaries of the zone(s), and sends them to the server. The server provides the global coordinates of the virtual boundaries of the zone(s) to the robot. The robot segments the virtual boundary into segments corresponding to partial maps stored in a memory of the robot, and converts the global coordinates into local coordinates for the partial maps. The partial maps can correspond to the desired range of a LIDAR, VSLAM or other localization system on the robot. The partial maps can overlap to ensure complete coverage and the ability to track location when moving from one partial map to another. In one embodiment, the partial maps are 5×5 meter areas, or another dimension less than 10 meters in any cross-section.

As the robot executes a cleaning run, it will access each partial map as needed, and will also access the local coordinates of the virtual boundary zone segment for that partial map. The robot processor will continuously detect its current location using a LIDAR or other mechanism, and will compare its coordinates to the coordinates of the virtual boundary zone segments. When a zone boundary segment is reached, the robot will change direction. The robot will detect when the front edge of the robot is sufficiently close to the boundary to still allow the robot to turn, move to the adjacent uncleaned swath, and then reverse direction to continue cleaning.

Removable Physical Boundary Indicator.

In one embodiment, a user can physically indicate a zone by placing magnetic strips, IR transponders, or other boundary indicators at one or more locations during a map generating run for a robot. The robot records the zone boundary information in conjunction with the map as the locations in an area are mapped. The user can then remove the boundary indicator, or move it to another location for the same map generating run. For example, the user may move the boundary indicator to the next door or hallway entrance the robot will encounter. A single magnetic strip across the only door to a room will result in the entire room being designated as a zone. Thus, instead of the user marking the zone boundaries on a map, the robot generates the boundaries as it generates the map and each partial map. The robot may extend boundaries that don't go all the way to a wall, or make them closer to an object, as discussed above. The zone boundary segments are stored in the robot's local memory for each partial map. When the mapping is completed, the robot generates a PNG image of the map that includes the virtual boundaries delineated on the map. The PNG image with the virtual boundaries is then uploaded to the server, and then downloaded to the app on the user device.

In one embodiment, the user can then confirm the zones on the map, or modify it. For example, the user may realize the boundary is not in exactly the right location, such that the robot, for example, would clean up to an inch from a closed door location, but not the area up to the edge of the door or under the door.

In another example, a particular cleaning mode can be associated with different times for the zone, such as cleaning in a longitudinal direction at one time on a schedule, and cleaning in a latitudinal direction at another time. This can provide a more thorough cleaning over time, without requiring multiple passes in multiple directions during a single cleaning run, thus limiting the time for a single cleaning run.

In one embodiment, a preview of the map with the zones is provided to the user for acceptance. The robot app may make suggestions based on the zones and schedule, such as a suggested relocation of the base station in view of the zones to optimize the cleaning time.

In one embodiment, multiple global maps are provided, such as where the robot is moved to different floors. Each floor can have its own map, and its own user-defined zones, automatically-generated zones, virtual boundaries and schedules. Each floor has its own zones, and a separate map for a user to indicate and name those zones.

In one embodiment, the robot has one or more indicators that will show a user when it has encountered a zone boundary. The indicator can be a light that flashes red when a boundary is reached. This will inform the user that the reason the robot is turning around is because of the virtual boundary of the zone. The indicator can also be a visible line of light projected in both directions from the robot to indicate the full extent of the virtual boundary. The light may flash, be a different color, or otherwise indicate a permanent virtual boundary versus one for just this scheduled time. This may prompt the user to reset the zones if the situation has changed, such as the user just had a party in a room that otherwise is rarely used. The feedback may also be audible, and can come directly from the robot, or be indicated by the app on the user device. In one embodiment, if the app is open on the user device, the feedback is provided on the user device. If the app is closed, the feedback is provided from the robot itself.

In one embodiment, the user can set the zones by using the robot app on the mobile device like a remote control. The user can set a "start zone" button, and direct the robot along a virtual line or multiple virtual lines. One or two lines can be enough to indicate a zone, if unbroken walls are on the other sides. So the robot knows which side of the line is the zone, the user can either click a "zone to right" or "zone to left" icon/button, or could direct the robot to enter the appropriate zone after traversing the virtual boundary. A signal is then sent to the robot, either directly (using IR, Bluetooth, local WiFi, etc.), or through the server (over then Internet then a local area network to the robot).

Multiple Robots.

In one embodiment, multiple cleaning robots are used. This provides a variety of advantages. Upon initial use, one robot can be designated as the training robot, mapping the area and suggesting virtual boundaries. The second ($3^{rd}$, $4^{th}$, etc.) robot can follow behind, doing a normal cleaning, and thus taking more time in each room or space. The training robot can transmit each room of the map as it is generated to the second robot, so the second robot need not do mapping and need not include the processing needed for mapping. This transmission can be direct, by way of a user device, or by uploading to a remote server which then downloads to the second robot. In one example, the new robot may be a replacement robot. Multiple maps for multiple floors or floor plans can be shared. For example, a second robot normally on a second floor may detect that it has been moved to the first floor, and can switch over to the first floor map.

Zones may be drawn based on robot type, or simply a division of duties. With multiple robots, each can be assigned a portion of the zones to be cleaned. Thus, different zones would be provided to each robot. Cheaper robots could be used for easier to clean areas, such as hardwood floors. Or different robots could have different, optimized battery storage. For one example, a training or mapping robot could have only mapping and image taking capability, and no cleaning apparatus, with limited battery power for a short training run. Thus, the training robot could be much smaller and cheaper. The cleaning robots could have much more battery power for extended cleaning runs.

User Interactions.

In one embodiment, the robot has a camera and can provide images or video to the user to indicate zones. The user could direct the camera viewpoint via remote control for a better view of the area. Also, the user commands to generate a zone can be by any method, not simply drawing a line with a finger or stylus on a displayed map. For example, the robot could map areas and identify them, such as by image recognition (dishwasher means it's the kitchen, etc.), or by prompting the user to label areas from the map and/or images. The user could then simply say, for example, "clean the kitchen," and the robot will draw virtual boundaries at the entrances to the kitchen to create a kitchen zone. Additionally, object or areas could be identified on a map, and a user could tap them to place off limits, and double tap to remove the virtual boundaries (or vice-versa). The robot would then draw a virtual boundary around the indicated object or area. Alternately, drop down menus could be used after tapping, or any other GUI interface.

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for operating a cleaning robot comprising:
providing a map of an area on a user interface of a user device;
receiving a user indication of a first plurality of zones to be cleaned on the map;
transmitting data identifying the first plurality of zones to the cleaning robot;
determining, by the cleaning robot, a first optimum order of cleaning of the first plurality of zones, and a route to each of the first plurality of zones in the first optimum order; and
cleaning the first plurality of zones by the cleaning robot and traversing portions of the area between the first plurality of zones without cleaning.

2. The method of claim 1 wherein the user indication of a plurality of zones to be cleaned on the map is on a first floor plan, and further comprising:
indicating, by the user, a second plurality of zones to be cleaned on a second floor plan;
transferring data identifying the second plurality of zones to the cleaning robot; and
determining, by the cleaning robot, a second optimum order of cleaning of the second plurality of zones, and a route to each of the second plurality of zones in the second optimum order.

3. The method of claim 2 further comprising:
receiving a user indication of a first cleaning schedule for the first plurality of zones, and a second cleaning schedule for the second plurality of zones;
transferring the first and second cleaning schedules to the cleaning robot;
determining, by the robot, at a start time indicated by the first cleaning schedule, whether the cleaning robot is currently located on the first floor plan corresponding to the first cleaning schedule; and
navigating through the first plurality of zones and cleaning the first plurality of zones if the cleaning robot determines it is currently located on the first floor plan.

4. The method of claim 3 further comprising:
if the cleaning robot determines it is not on the first floor plan at the start time indicated by the first cleaning schedule, transmitting a prompt to the user interface for the user to move the robot to the first floor plan.

5. The method of claim 1 further comprising:
determining a starting point in one of the plurality of zones;
transferring data identifying the starting point in the zone to the robot;
determining, by the robot, a best path to navigate from a location of the robot to the starting point; and
navigating, by the robot, to the starting point.

6. The method of claim 1 further comprising:
automatically correcting at least one zone of the first plurality of zones on the user device to provide a corrected zone; and
prompting the user to accept the corrected zone.

7. The method of claim 6 further comprising:
correcting a first zone drawn partially beyond a first wall to stop at the first wall; or
correcting a second zone drawn to stop just short of a second wall by extending the second zone to the second wall.

8. The method of claim 6 further comprising:
determining that the one zone encompasses an obstacle;
excluding the obstacle from the one zone to provide a revised zone; and
transmitting the revised zone to the cleaning robot.

9. The method of claim 1 further comprising:
determining, by the cleaning robot, an amount of battery charge of the cleaning robot; and
calculating the first optimum order to take maximum advantage of the amount of battery charge.

10. The method of claim 1 wherein the first plurality of zones are discontiguous.

11. A method for operating a cleaning robot comprising:
providing a map of an area on a user interface of a user device;
receiving a user indication of a first plurality of zones to be cleaned on a first floor plan on the map;
transmitting data identifying the first plurality of zones to the cleaning robot; and
determining, by the cleaning robot, a first optimum order of cleaning of the first plurality of zones, and a route to each of the first plurality of zones in the first optimum order;
cleaning the first plurality of zones by the cleaning robot and traversing portions of the area between the first plurality of zones without cleaning;
indicating, by the user, a second plurality of zones to be cleaned on a second floor plan;
transferring data identifying the second plurality of zones to the cleaning robot;
determining, by the cleaning robot, a second optimum order of cleaning of the second plurality of zones, and a route to each of the second plurality of zones in the second optimum order;
receiving a user indication of a first cleaning schedule for the first plurality of zones, and a second cleaning schedule for the second plurality of zones;
transferring the first and second cleaning schedules to the cleaning robot;
determining, by the robot, at a start time indicated by the first cleaning schedule, whether the cleaning robot is currently located on the first floor plan corresponding to the first cleaning schedule; and
navigating through the first plurality of zones and cleaning the first plurality of zones if the cleaning robot determines it is currently located on the first floor plan.

12. A cleaning robot, comprising:
a robot housing;
a motor mounted in the housing for moving the cleaning robot;
a battery connected to provide electrical power to the motor;
a charge level battery sensor connected to the battery;
a recharging connector coupled to the battery;
a sensor mounted in the robot for detecting surroundings;
a processor mounted in the robot;
a memory in the robot;
a localization module in the robot;
non-transitory, computer-readable code in the memory having instructions for:
receiving data from a user device identifying a first plurality of zones on a map to the cleaning robot;
determining, by the cleaning robot, a first optimum order of cleaning of the first plurality of zones, and a route to each of the first plurality of zones in the first optimum order; and cleaning the first plurality of zones by the cleaning robot and traversing portions of an area between the first plurality of zones without cleaning.

13. The cleaning robot of claim 12 wherein the first plurality of zones to be cleaned on the map is on a first floor plan and the non-transitory, computer-readable code in the memory further comprises instructions for:
receiving, from the user device, data identifying a second plurality of zones to be cleaned on a second floor plan; and
determining a second optimum order of cleaning of the second plurality of zones, and a route to each of the second plurality of zones in the second optimum order.

14. The cleaning robot of claim 13 wherein the non-transitory, computer-readable code in the memory further comprises instructions for:
receiving a user indication of a first cleaning schedule for the first plurality of zones, and a second cleaning schedule for the second plurality of zones;
determining at a start time indicated by the first cleaning schedule, whether the cleaning robot is currently located on the first floor plan corresponding to the first cleaning schedule; and
navigating through the first plurality of zones and cleaning the first plurality of zones if the cleaning robot determines it is currently located on the first floor plan.

15. The cleaning robot of claim 14 wherein the non-transitory, computer-readable code in the memory further comprises instructions for:
if the cleaning robot determines it is not on the first floor plan at the start time indicated by the first cleaning schedule, transmitting a prompt to the user interface for the user to move the robot to the first floor plan.

16. The cleaning robot of claim 12 wherein the non-transitory, computer-readable code in the memory further comprises instructions for:
receiving data identifying a starting point in a starting zone of the plurality of zones;
determining a best path to navigate from a location of the robot to the starting point; and
navigating, by the robot, to the starting point.

17. The cleaning robot of claim 12 wherein the non-transitory, computer-readable code in the memory further comprises instructions for:
determining an optimum starting path from a charging station to a starting zone;
if the optimum starting path reaches the starting zone at a new point different from the starting point, changing the starting point to the new point.

18. The cleaning robot of claim 12 wherein the non-transitory, computer-readable code in the memory further comprises instructions for:
determining an amount of battery charge of the cleaning robot; and
calculating the first optimum order to take maximum advantage of the amount of battery charge.

19. The cleaning robot of claim 12 wherein the instructions in the non-transitory, computer-readable code in the memory for determining a route to each of the first plurality of zones in the first optimum order further comprises instructions for:
choosing a farther zone from a charging base before a closest zone, so that when the robot finishes cleaning the closest zone last, the cleaning robot is closer to the charging base for a return to the charging base.

20. The cleaning robot of claim 12 wherein the instructions in the non-transitory, computer-readable code in the memory for determining a route to each of the first plurality of zones in the first optimum order further comprises instructions for:
determining a shortest path which avoids obstacles, avoids drops, and takes into account a last open/closed state of doors and hallway locations.

21. Non-transitory, computer-readable code for use in a memory of a user device for controlling a cleaning robot, having instructions for:
providing a map of an area on a user interface of the user device;
receiving a user indication of a first plurality of zones to be cleaned on the map;
transmitting data identifying the first plurality of zones to the cleaning robot;
providing zone shapes to the user interface, including a rectangle, L-shape and T-shape:
providing prompts to the user interface for labeling the zones; and
providing prompts to the user interface for indicating different modes for different zones.

* * * * *